United States Patent [19]

Woytek et al.

[11] 4,156,598

[45] May 29, 1979

[54] PURIFICATION OF NITROGEN TRIFLUORIDE ATMOSPHERES

[75] Inventors: Andrew J. Woytek, Allentown; John T. Lileck, Tamaqua, both of Pa.

[73] Assignee: Air Products and Chemicals, Inc., Allentown, Pa.

[21] Appl. No.: 913,784

[22] Filed: Jun. 8, 1978

[51] Int. Cl.$^2$ ............................................. B01D 53/02
[52] U.S. Cl. ........................................... 55/68; 55/71; 55/75; 423/406; 423/489
[58] Field of Search ................... 423/406, 489; 55/71, 55/75, 68

[56] References Cited

U.S. PATENT DOCUMENTS

| | | | |
|---|---|---|---|
| 3,043,662 | 7/1962 | Lipscomb | 423/406 |
| 3,235,474 | 2/1966 | Tompkins et al. | 423/489 |
| 3,356,454 | 12/1967 | Tompkins et al. | 423/408 |
| 4,091,081 | 5/1978 | Woytek | 423/406 |

OTHER PUBLICATIONS

Colburn, C. et al., "Difluorodiazine" in *J. Am. Chem. Soc.*, vol. 81, (1959), pp. 6397, 6398.

*Primary Examiner*—Brian Hearn
*Attorney, Agent, or Firm*—E. E. Innis; R. L. Brewer

[57] ABSTRACT

This invention relates to an improvement in a process for purifying nitrogen trifluoride atmospheres generally contaminated with nitrous oxide, water, and dinitrogen difluoride. The improvement for extending adsorber life resides in reducing the dinitrogen difluoride content in the atmosphere to less than 0.03% by volume prior to passing the atmosphere through the adsorber.

10 Claims, No Drawings

PURIFICATION OF NITROGEN TRIFLUORIDE ATMOSPHERES

BACKGROUND OF THE INVENTION

1. Field of the Invention

This invention relates to a process for purifying a nitrogen trifluoride atmosphere contaminated with a variety of components.

2. Description of the Prior Art

Nitrogen trifluoride is a colorless gas having a boiling point of about −129° C. and a melting point of about −208° C. Recently there has been interest in nitrogen trifluoride as a source of fluorine primarily for the preparation of fluorocarbons and fluoroolefins and as an oxidizer. Nitrogen trifluoride has advantages over elemental fluorine as a fluorine source in that it is relatively inert at low temperatures, e.g., 70° F., whereas fluorine is not, and it can be compressed to high pressures, e.g., 1,000 psig for shipment.

Nitrogen trifluoride can be made by several methods. The primary methods include the electrolysis of molten ammonium acid fluoride; the reaction of fluorine azide with elemental fluorine and the reaction of ammonia and elemental fluorine. A particularly desirable process is shown is U.S. Pat. No. 4,091,081. In that patent nitrogen trifluoride is produced in good yield with reduced problems as compared to the prior art by reacting ammonia and fluorine in the presence of ammonium bifluoride.

In each of the above processes the nitrogen trifluoride atmosphere will contain contaminant materials, particularly nitrous oxide and fluorine compounds such as carbon tetrafluoride, dinitrogen difluoride and hydrogen fluoride.

Several U.S. Patents show techniques for producing nitrogen trifluoride and techniques for recovering the product. These include:

U.S. Pat. No. 3,043,662, which shows preparing nitrogen trifluoride by reacting a carbonyl fluoride with carbon tetrafluoride and binary oxides of nitrogen by reacting at temperatures of 2,000–4,000° C. in an electric arc. The nitrogen trifluoride atmosphere is removed from the reactor, quenched and then cooled in a liquid nitrogen trap.

U.S. Pat. Nos. 3,235,474 and 3,356,454 disclose a technique for producing nitrogen trifluoride by the electrolysis of ammonium bifluoride. The purification processes disclosed involve, seriatim, an initial cooling of the atmosphere from the reactor, the removal of hydrogen fluoride by passing the atmosphere through a sodium fluoride trap, the removal of nitrous oxide, and some dinitrogen difluoride in a zeolite adsorber, and recovery of product nitrogen trifluoride in a liquefied nitrogen cooled trap.

Several problems have been associated with the prior art purification processes, and particularly with respect to the adsorber operation. For one reason or another, the adsorber life has been extremely short based on the estimated capacity of the adsorbent. Quite often the adsorbers had to be shut down because nitrous oxide was not being removed and because nitrogen trifluoride was being decomposed presumably because of temperature excursions in the adsorber.

The present process eliminates the basic problem of reduced adsorber life, and in addition, virtually eliminates temperature excursions within the adsorber and nitrogen trifluoride decomposition.

SUMMARY OF THE INVENTION

This invention relates to an improvement in a process for purifying an atmosphere containing nitrogen trifluoride and contaminated with dinitrogen difluoride and nitrous oxide. In the basic purification process, the atmosphere obtained from the nitrogen trifluoride reactor is initially passed through a scrubber bath to remove hydrogen fluoride, then through an adsorber containing a synthetic crystalline alumino-silicate (zeolite) adsorbent to remove the nitrous oxide and water if present, and then through a cold trap cooled with a cryogenic fluid, e.g., liquid nitrogen. Liquefied nitrogen trifluoride is recovered in the trap. The improvement constituting the basis of this invention resides in reducing the dinitrogen difluoride content in those nitrogen trifluoride containing atmospheres having a dinitrogen trifluoride content greater than about 0.05% by volume to less than about 0.03%, and preferably below 0.01% by volume prior to passing the atmosphere through the adsorber.

The advantages of this process include:
- the ability to operate an adsorber over an extended period of time as compared to the prior art techniques;
- the ability to eliminate temperature excursions within the adsorber; and
- the ability to substantially eliminate nitrogen trifluoride decomposition in the adsorber purification process.

DESCRIPTION OF THE PREFERRED EMBODIMENTS

The nitrogen trifluoride containing atmospheres that can be treated by the present process can vary widely in composition. Certainly any of those atmospheres that are obtained by the electrolytic method involving the electrolysis of ammonium bifluoride, the reaction of ammonia and fluorine in the presence of ammonium bifluoride, and the reaction of ammonia and fluorine under other conditions can be processed. Typically, those gas streams will contain from about 5–50% nitrogen triflouride with a normal range between about 15 and 25% by volume, a dinitrogen difluoride content from about 0.05–3%, and typically from about 0.5–2%, a nitrous oxide content from 0–2%, a fluorine concentration of from a trace to about 2.5%, a hydrogen fluoride concentration (on a calculated basis) from about 1–10% and a nitrogen concentration from 65–82% as a balance.

As described in U.S. Pat. Nos. 3,356,454 and 4,091,081, the atmospheres obtained from the reactor are passed through a mist eliminator pad in order to remove by-product ammonium fluoride or ammonium bifluoride. Then the atmosphere is passed through a bath containing a reactant capable of forming a salt with the hydrogen fluoride (HF) or residual fluorine and effecting removal. Typically, this reactant is an aqueous solution of an alkali metal hydroxide, e.g., potassium or sodium hydroxide. Alternatively, the reactant or adsorbent material can be sodium fluoride or other material used for such purpose. The latter procedure is less desirable than the alkali metal hydroxide treatment as it doesn't remove free fluorine and it is not satisfactory for handling atmospheres high in HF content. After the HF and residual fluorine is removed, it has been common practice to remove the nitrous oxide and water, if present, in an adsorption zone.

In the present process, the dinitrogen difluoride content of the nitrogen trifluoride atmosphere is reduced prior to treatment in the nitrous oxide-water adsorbers as in the prior art. Depending on which scrubbing treatment is used, the dinitrogen difluoride may be removed prior to or after the scrubbing operation. When the alkali metal hydroxide scrubbing procedure is used, the dinitrogen difluoride is removed prior to scrubbing as the water picked up during scrubbing may interfere with the dinitrogen difluoride removal. If the sodium fluoride trap is used, it doesn't make any difference as little to no water is introduced into the system.

We have found that when the dinitrogen difluoride content in the atmosphere is reduced to a level of less than 0.03% by volume, and preferably less than 0.01% by volume, enhanced adsorber life can be achieved. We have also noted that when operating with nitrogen trifluoride atmospheres containing moderately high levels of nitrogen trifluoride, e.g., from 10 to 25% by volume that excellent results in terms of adsorber operation can be achieved when the ratio of nitrogen trifluoride to dinitrogen difluoride, after reduction, is at least 1,000, and generally at least 5,000. These latter conditions are preferred in obtaining substantially extended adsorber life.

The dinitrogen difluoride can be removed by the process described in copending U.S. Pat. application having Ser. No. 894,114 and a filing date of Apr. 6, 1978 and such process is incorporated by reference. The removal process is particularly efficient when applied to the present process in that it selectively defluorinates the dinitrogen difluoride without effecting significant reduction of the nitrogen trifluoride. By that it is meant that generally less than 2% of the nitrogen trifluoride is reduced or defluorinated in the process. The process for selectively defluorinating dinitrogen difluoride involves passing the nitrogen trifluoride containing atmosphere through a reaction zone containing a particulate elemental metal under specified conditions. The elemental metal, of course, is one which is sufficiently reactive to defluorinate dinitrogen difluoride but inert to the nitrogen trifluoride. The elemental metal preferably is in form of the finely divided powder having a particle size of from about 1/64th-½" in size and examples of elemental metals and alloys used in the process consist of stainless steel, carbon steel, copper, alumina, zinc, lead, nickel, iron, and cobalt or alloy thereof. Nickel is the preferred metal.

Defluorination of the dinitrogen difluoride with the elemental metal is effected by passing the nitrogen trifluoride atmosphere through a reaction zone containing the particulate elemental metal at a temperature of from about 300°–1,000° F., and preferably at a temperature of from 400°–700° F. The minimum temperature used is that which is sufficient to effect decomposition of the dinitrogen difluoride. However, temperatures much below about 300° F. require longer reaction times and often at such longer reaction time there is a greater loss of nitrogen trifluoride. The nitrogen trifluoride atmosphere should be maintained in the reaction zone for a period of time sufficient to effect partial defluorination of the dinitrogen difluoride. This generally is from about 1–1,000 seconds. With dinitrogen difluoride concentrations greater than about 0.1%, e.g., 0.1–3%, a residence time of about 3–10 seconds in commercial size equipment can be used to reduce the dinitrogen difluoride content to as low as 0.01% or less.

After the dinitrogen difluoride in the nitrogen trifluoride containing atmosphere has been reduced to less than 0.03% by volume, and preferably 0.01% or less by volume, the nitrous oxide and water, if present, can be removed by passing the atmosphere through an adsorber containing conventional synthetic crystalline alumino-silicates (often referred to as a zeolite) for removing nitrous oxide and water. Preferred adsorbents have the following composition expressed in terms of oxides:

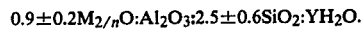

$$0.9 \pm 0.2 M_{2/n}O : Al_2O_3 : 2.5 \pm 0.6 SiO_2 : YH_2O.$$

In the above formula, the symbol M represents at least one cation having a valence represented by a symbol n of not more than 3, the symbol Y representing any value up to about 8. The atoms of this adsorbent are arranged in a unit cell in a manner wherein the X-ray powder diffraction pattern of the material is essentially the same as that shown in the table below wherein d is the interplanar spacing in angstroms (A).

TABLE E

| [d value in A] | |
| --- | --- |
| 14.42 ± 0.2 | 3.33 ± 0.05 |
| 8.82 ± 0.1 | 3.88 ± 0.05 |
| 4.41 ± 0.05 | 2.79 ± 0.05 |
| 3.80 ± 0.05 | 2.66 ± 0.05 |

Examples of preferred molecular sieve alumino-silicates are the alkali and alkaline earth metal forms of the type A and type X crystal structure. Of these, the sodium and calcium forms are preferred.

The adsorbers containing the synthetic crystalline alumino-silicates are operated as alternate pairs so that one adsorber can be regenerated while the other is on-stream. This manner of operation is well-known in the art. Normally the adsorbers are operated until there is a detectable quantity of nitrous oxide leaving the adsorber at which time the adsorber is switched to the regenerated adsorber. The spent adsorber is then regenerated by permitting nitrogen to flow through the adsorber at an elevated temperature.

In the past there have been extreme temperature excursions occurring in the adsorbers. This was evidenced by monitoring the inlet and outlet temperature of the adsorber during nitrogen regeneration. Often there was a temperature front with an initial low temperature, then a high temperature, and then a final low temperature. This evidence indicated to us that hot spots had developed within the adsorber unit. Although not intending to be bound by theory, we believe the presence of the dinitrogen difluoride in the atmosphere effects an exothermic reaction with the zeolite and causes an initial hot spot to develop. As the temperature increases, e.g., even to a level as low as 200°–220° F., the nitrogen trifluoride in the atmosphere then undergoes exothermic decomposition to produce nitric oxide and even higher temperatures.

As with the conventional prior art process, the remaining step in the overall process involves the recovery of nitrogen trifluoride from the atmosphere obtained from the adsorbers and the procedure used for recovering the nitrogen trifluoride after removal of the nitrous oxide and water is not critical. Generally the procedure involves condensing the nitrogen trifluoride from the other components by passing the atmosphere through a cold trap cooled by liquid nitrogen. The condensed nitrogen trifluoride is removed from the trap, vaporized, compressed and charged to cylinders.

The following examples are provided to illustrate preferred embodiments in the invention and are not intended to restrict the scope thereof. All percentages are relating to gas composition are expressed as volume percent.

EXAMPLE 1

Several nitrogen trifluoride containing atmospheres were produced by the direct fluorination of ammonia in the presence of ammonium bifluoride and more particularly described in Example 1 of U.S. Pat. No. 4,091,081. Referring to Table 1, runs 1–4 were first scrubbed by passing the reactor atmospheres through an aqueous solution of potassium hydroxide at a temperature of about 40° C. At this stage the atmospheres were contaminated with water, nitrous oxide and dinitrogen difluoride with the dinitrogen difluoride content being about 0.1–1% by volume. Then, the nitrogen trifluoride atmospheres were passed through a first adsorber containing approximately 4.37 cubic feet of 13 X (sodium form) and a second adsorber containing 13.25 cubic feet of 5 A (calcium form) molecular sieve manufactured by the Union Carbide Corporation. In runs 5–12, and in contrast to runs 1–4, the nitrogen trifluoride streams from the reaction were first passed through a reactor made of schedule 40 nickel pipe and filled with ⅛ inch diameter nickel balls. At a temperature of from 400°–500° F. to remove dinitrogen difluoride. The residence time varied from about two to five seconds. The dinitrogen difluoride was reduced by this metal from the initial level of 0.1% and above to the level indicated in Table 1. Then as in runs 1–4, the atmospheres, deficient in dinitrogen difluoride, were scrubbed to remove HF and passed through the adsorber at a rate of 240–260 scfh, (standard cubic feet per hour). The time was recorded until there was a nitrous oxide detection by gas chromotography. Table 1 below gives these results.

TABLE 1

| Run | %$NF_3$ | %$N_2F_2$ | %$N_2O$ | ratio %$NF_3$/ %$NF_2F_2$ | on-stream time until $N_2O$ Breakthrough hrs. |
|---|---|---|---|---|---|
| 1 | 13.90 | 0.11 | 0.043 | 132 | 6.25 |
| 2 | 10.97 | 0.096 | 0.01 | 114 | 4.5 |
| 3 | 12.69 | 0.048 | 0.01 | 262 | 9.0 |
| 4 | 12.99 | 0.045 | 0.07 | 289 | 9.0 |
| 5 | 10.19 | 0.027 | 0.01 | 377 | 11.25 |
| 6 | 12.71 | 0.026 | 0.01 | 489 | 15.00 |
| 7 | 15.00 | 0.029 | 0.01 | 517 | 14.25 |
| 8 | 11.93 | 0.013 | 0.022 | 917 | 18.00 |
| 9 | 11.94 | <0.01 | 0.036 | 1194 | 29.25 |
| 10 | 15.29 | <0.01 | 0.01 | 1529 | 31.0 |
| 11 | 14.20 | <0.01 | — | 1420 | 72.0 |
| 12 | 13.51 | <0.01 | 0.01 | 1351 | 46.0 |

As noted in the above examples, the adsorber life ranged from about four to ten hours when there was no pretreatment of the nitrogen trifluoride atmosphere prior to passing the atmosphere through the adsorber and when the dinitrogen difluoride concentration was above 0.03%. On the other hand, in runs 5–12 where the dinitrogen difluoride content was reduced to about 0.03% and below, the adsorber life was extended by a factor of 2–2.5 (based on the 0.1% dinitrogen difluoride concentration). In those cases where the dinitrogen difluoride content was less than 0.01%, e.g., runs 9–12, the adsorber life was extended by a factor of at least 4.5–5. In runs 9–12, the concentration actually was less than 0.01% as 0.01% was about the lowest level that can be detected by the gas chromatograph employed. It should also be noted from the above examples that the ratio of nitrogen trifluoride to dinitrogen difluoride in the atmosphere feedstream prior to adsorption gave excellent results where the ratio was about 500, and better results were obtained where the ratio was at least about 1,000. On a product $NF_3$ analysis, the $NF_3/N_2F_2$ ratio was about 9,000 for runs 10–12 thus showing that the $N_2F_2$ content was substantially below 0.01%.

It was noted during the regeneration of the adsorbers that there were temperature excursions within the adsorber in runs 1–4. This was evidenced by the fact that during the regeneration, the temperature of the nitrogen as it passed through the adsorber often increased to a temperature of 400° F., and even as high as 600° F. Excursions were not apparent in runs 5–12.

EXAMPLE 2

The procedure of Example 1 was repeated except that an initial analysis of the nitrogen trifluoride atmosphere was not made. Based on the product collected, analysis showed a ratio of nitrogen trifluoride to dinitrogen difluoride of about 9935. When this atmosphere was passed through the adsorber in the same manner as Example 1 and at the same 240–260 scfh rate, the adsorber life was 56.5 hours.

Based on this test run, and runs 9–12 in Example 1 it would appear that as the ratio of nitrogen trifluoride to dinitrogen difluoride is increased, e.g. above 5,000 and generally up to 10,000 or greater that the adsorber life can be extended even longer.

What is claimed is:

1. In a process for removing nitrous oxide from a nitrogen trifluoride atmosphere contaminated with dinitrogen difluoride, which comprises passing said atmosphere through an adsorption zone containing a synthetic zeolite adsorbent, the improvement for treating atmospheres having a dinitrogen difluoride content greater than 0.05% by volume and extending the adsorber life which comprises:

reducing the dinitrogen difluoride content to less than 0.03% by volume prior to contacting said atmosphere with said zeolite adsorbent.

2. The process of claim 1 wherein the initial dinitrogen difluoride content in said atmosphere is from about 0.05–3% by volume.

3. The process of claim 2 wherein said atmosphere is contaminated with water and the zeolite is capable of removing said water.

4. The process of claim 3 wherein the dinitrogen difluoride content in said atmosphere is reduced to less than 0.01% by volume prior to contacting the atmosphere with said zeolite adsorbent.

5. The process of claim 1 wherein said atmosphere contains from about 5–50% nitrogen trifluoride by volume.

6. The process of claims 2, 3, 4 or 5 wherein the ratio of nitrogen trifluoride to dinitrogen difluoride in said atmosphere is greater than 5,000 prior to passing said atmosphere through said adsorber.

7. The process of claim 1 wherein said synthetic zeolite adsorbent is selected from the group consisting of an alkali and alkaline earth metal alumino-silicate.

8. The process of claim 7 wherein said alkali metal is sodium.

9. The process of claim 7 wherein said alkaline earth metal is calcium.

10. The process of claims 8 or 9 wherein said zeolite adsorbent has a crystal structure of the X or A type.

* * * * *